YUKIYA FUJIMOTO AND
MASANARI MATSUSHITA, INVENTORS

YUKIYA FUJIMOTO
MASANARI MATSUSHITA,
INVENTORS

BY Wenderoth, Lind, Ponack
Attorneys

United States Patent Office

3,533,773
Patented Oct. 13, 1970

3,533,773
APPARATUS FOR MANUFACTURING FLOAT GLASS WITH GRAPHITE HEATING MEANS
Yukiya Fujimoto and Masanari Matsushita, Maizuru-shi, Japan, assignors to Nippon Sheet Glass Co., Ltd., Higashi-ku, Osaka, Japan
Filed Dec. 26, 1967, Ser. No. 693,438
Claims priority, application Japan, Dec. 28, 1966, 42/1,390
Int. Cl. C03b 18/02
U.S. Cl. 65—182           5 Claims

ABSTRACT OF THE DISCLOSURE

An apparatus for manufacturing a flat glass comprising a glass melting furnace, a float tank containing a molten metal bath and a canal connecting the furnace and the tank with each other, characterized in that an electric heater having a zigzag shape flat graphite heating element is provided, in proximity to the surface of glass, at least either above the edge portion of a stream of molten glass at a pouring spout forming a part of the canal or above the edge portions of a stream of molten glass between restricting tiles disposed at the inlet end of the bath. A nonoxidizing atmosphere is provided to surround the graphite heating element.

---

This invention concerns an apparatus for manufacturing a flat glass continuously by flowing a molten glass onto a bath of molten metal, advancing it along a molten metal bath, and forming the molten glass into a ribbon shape.

A molten glass melted in a glass melting furnace flows onto a molten metal bath through a canal connecting the glass melting furnace to the molten metal bath. This canal is provided with tweels, and the amount of molten glass flowing onto the molten metal bath is regulated by the up-and-down movement of the tweels. A molten metal having a specific gravity greater than the molten glass, such as tin or a tin alloy, is used as the molten metal bath. A molten glass flowing onto the molten metal bath is reduced in thickness, while freely spreading, until it attains a certain equilibrated thickness determined according to the specific gravities of the molten glass and molten metal, the surface tension of the molten glass and the advancing speed of the ribbon-like glass. In order to control the spreading of a molten glass flowing onto the molten metal bath, a width restricting member is provided at an inlet end of the molten metal bath. The molten glass flowing onto the molten metal bath is made into a glass ribbon of a certain thickness while spreading along the width restricting member, and advances along the molten metal bath. While advancing, the glass ribbon is decreased in temperature by the temperature adjustment of the molten metal bath. At an outlet end of the molten metal bath, the glass ribbon attains a temperature at which it is no longer harmed, and is withdrawn by means of a transporting roll. A space covering the molten metal bath is filled with a nonoxidating atmosphere such as a mixture of nitrogen and hydrogen gas to prevent the oxidation of the molten metal.

In a conventional apparatus of this kind, molten glass flowing in contact with side walls of a canal connecting a glass melting furnace to a molten metal bath and a width restricting member provided at an inlet end of the molten metal bath is lower in temperature at its edge portions than at its central portion because it is deprived of heat by heat transmission to the side walls of the canal and the width restricting member. For this reason, the edge portions of the molten glass stream are likely to be subject to devitrification and are more viscous than the central portion. Moreover, the friction between the edge portions and the side walls of the canal and the width restricting member gets larger. The speed of the flowing of the edge portions of the molten glass is therefore slower than that of the central portion. Consequently, partial irregularity in temperature and thickness occurs in a glass ribbon advancing along a molten metal bath, and a final product does not become completely flat.

An object of this invention is to provide an apparatus for the manufacture of a flat glass free from the above-mentioned defects. Particularly, the invention provides an apparatus for the manufacture of a flat glass which makes it possible to manufacture a flat glass free from devitrification and of excellent flatness by heating the edge portions of a molten glass stream at the canal connecting a glass melting furnace to a molten metal bath and/or at the width restricting member by means of a flat heating element suitable for a concentrated heating provided in proximity to the surface of the molten glass.

For better understanding of the invention, one embodiment will now be described with reference to the accompanying drawings in which.

Figure 1:
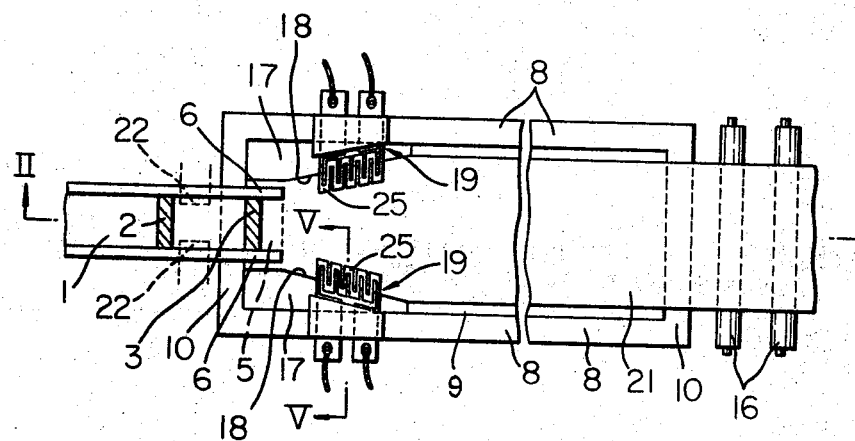
FIG. 1 is a plan view of the apparatus of the invention in which a heater having a flat heating element is provided at a width restricting member at the inlet end of a molten metal bath.
Figure 2:
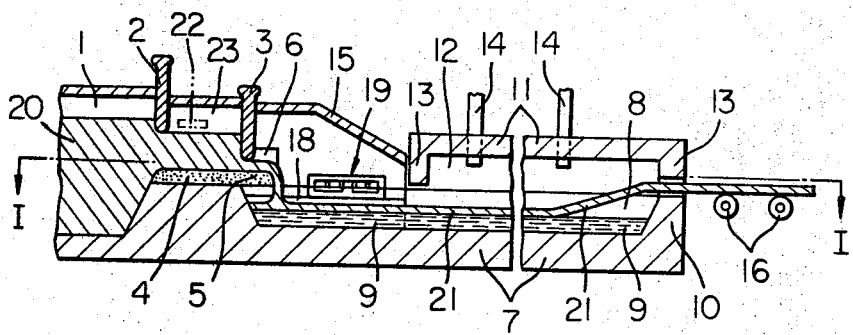
FIG. 2 is a sectional view taken along the line II—II of FIG. 1.
Figure 4:
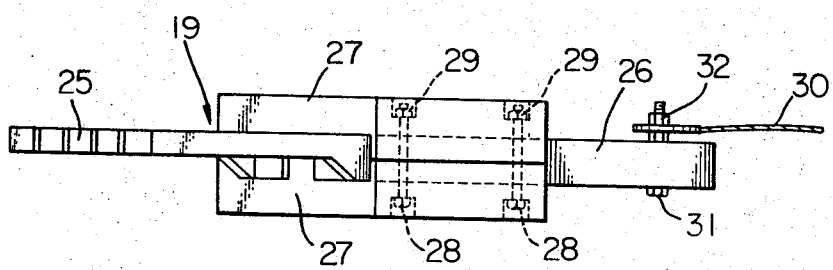
FIG. 4 is a side view of FIG. 3.
Figure 5:
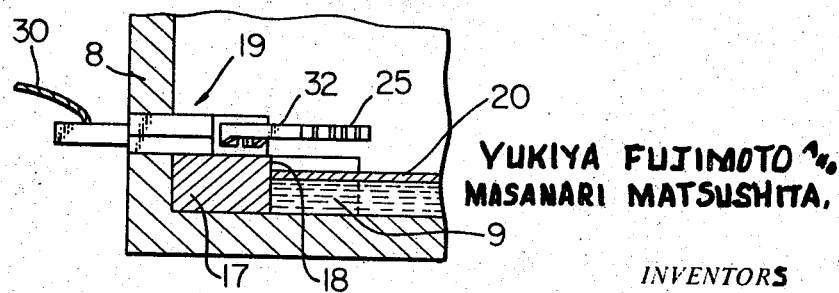
FIG. 5 is a sectional view taken along the line V—V of FIG. 1.

In FIGS. 1, 2 and 5, the reference numerals 1, 2, and 3 respectively show a canal connecting a glass melting furnace to a molten metal bath, a back tweel and a regulating tweel. Shown by reference numeral 4 is a pouring spout constituting part of the canal and being provided with a lip 5 projecting into a tank structure in which a molten metal is placed. Side jambs are shown by numeral 6. The tank in which a molten metal is placed consists of a floor 7, a side walls 8 and end walls 10. Within the tank is confined a molten metal 9 having a specific gravity greater than that of the molten glass, such as tin or a tin alloy. The tank is provided with a roof structure consisting of a roof 11, side walls 12 and end walls 13 covering the molten metal bath. A non-oxidizing gas such as a gaseous mixture of nitrogen and hydrogen is introducted from ducts 14 into a space covering the molten metal bath to prevent the oxidation of the molten metal. A cover 15 is for the purpose of covering a space between the regulating tweel 3 and the back walls 13 of the roof structure. A glass ribbon is withdrawn from the molten metal bath and transported by means of drive rolls 16. In the tank structure at the inlet end of the bath there are fixed restricting tiles 17 which extend to the full depth of the tank. A gap between both restricting tiles 17 is gradually broadened towards the outlet end of the tank, and the width of the molten glass during travelling is gradually splayed along the inside walls 18 of the restricting tiles 17. On the restricting tiles 17 are provided heaters 19 for heating the edge portions of a molten glass stream advancing between the restricting tiles 17 along the inside walls 18. The structure of heater 19 will be detailed later with reference to FIGS. 3 and 4.

A molten glass 20 delivered to the molten metal bath is regulated in its amount by the up-and-down movement of the back tweel 2 and regulating tweel 3, and flows from the lip 5 of the pouring spout 4 onto the molten metal bath 9 at a predetermined rate. The molten glass that has flowed onto the molten metal bath gradually increases in its width along the restricting tiles 17, and is made into a glass ribbon 21 which attains certain equilibrated thickness determined according to the specific gravities of the molten glass and molten metal, the surface tension of the molten glass, and the advancing speed of the ribbon-like glass. While advancing towards the outlet end of the bath, the glass ribbon 21 is reduced in temperature and is withdrawn unharmed from the molten metal bath by drive rolls 16 disposed at the outlet end of the bath.

The edge portions of a stream of the molten glass advancing along the restricting tiles 17 are lower in temperature and consequently more viscous than the central portion owing to the heat-transmission to the restricting tiles 17. The friction between the molten glass and the restricting tiles 17 in addition to the lower temperature makes the advancing speed of the edge portions slower than the central portion. This has been a cause of partial irregularity in temperature and thickness with a resultant inferior quality of the final product. According to the embodiment of present invention, the defects arising from the restricting tiles 17 can be successfully removed by heating the edge portions of a stream of the molten glass advancing along the restricting tiles 17 by means of the heater 19 having a flat heating element suited for a concentrated heating whose flat surface is in proximity to the surface of the glass in roughly parallel relationship with it. An amount of electric power to be added to one heater 19 is suitably 5–15 kilowatts. As an example, the current is 300 amperes, and the voltage is 50 volts. It is possible to cause a current to flow up to 700 amperes.

The heater 19 will now be described in detail with reference to FIGS. 3 and 4.

Figure 3:
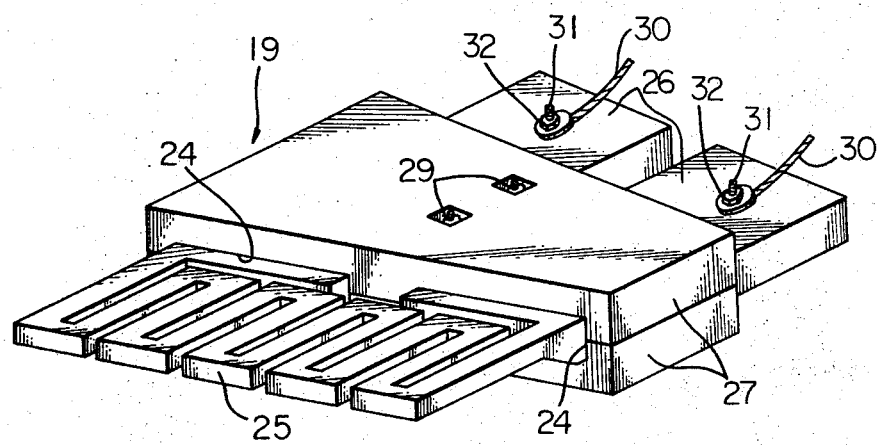
FIG. 3 is a perspective view of the heater in FIGS. 1 and 2.

FIGS. 3 and 4, the heater 19 consists of a heating element 25 and a lead element 26. The heating element 25 is of a flat shape and of a zigzag shape suitable for a local concentrated heating. The lead element 26 is much larger in cross section than the heating element 25, and so its electrical resistance is low and the amount of heat generated is very small. Shown by reference numeral 27 is a holder made of a refractory insulating material consisting of two blocks for holding the heater 19. Two notches 24 are provided on each of the opposing surfaces of the blocks of the holder 27, so that they may conform to each other when the two blocks are put together. Lead elements 26 are held by the holder 27 in conformity to the notches. The two blocks of the holder 27 are secured to each other by means of bolts 28 and nuts 29. Lead wires 30 are fixed to the lead elements 26 by means of bolts 31 and nuts 32.

The heater 19, especially heating element 25, is of graphite. In view of electrical, mechanical and thermal properties, economy and uniqueness of the field in which it is used, graphite is suitable as a heater material for a local concentrated heating. It can stand a large amount of heat per unit volume, can be processed easily in a complicated zigzag shape, is excellent in specific resistance and hot rigidity, and is inexpensive. In the above-mentioned embodiment, the heating element 25 is inserted in the tank structure containing the molten metal bath, and is not subject to wear by oxidation, as the atmosphere is non-oxidizing. Part of the lead element 26 is exposed to outer air, and is subject to wear owing to oxidation at high temperatures by its own heat and heat transmitted from the heating element 25. The wear owing to oxidation is therefore prevented by applying an antioxidative coating such as copper.

The heater 19 is provided on the restricting tiles 17 disposed at the inlet end of the bath according to the above-mentioned embodiment. A heater 22, as shown by dotted line in FIGS. 1 and 2, may be provided in a position 23 above the edge portions of a stream of molten glass in the pouring spout. In this case, it is necessary to fill a space 23 between the back tweel 2 and the regulating tweel 3 with a nonoxidizing atmosphere. The present invention also includes an apparatus in which heaters are provided only above the edge portions of a stream of molten glass; also at the pouring spout 4.

We claim:

1. Apparatus for use in the production of float sheet glass comprising a tank having inlet and outlet ends and containing a bath of molten metal upon which molten glass is flowed; a container for molten glass, positioned adjacent to said tank inlet end; means defining a canal interconnecting said tank inlet end and said container, and having a pouring spout from which molten glass flows into said tank; electric heater means including a zigzag shaped, flat, graphite heating element disposed in proximity to and for providing localized concentrated heating of the side edge portions of and above the molten glass adjacent said pouring spout; means for introducing an inert, nonoxidizing atmosphere so as to surround said graphite heating element, and means for effecting passage of the formed sheet glass from said tank.

2. Apparatus as defined in claim 1, wherein the molten metal bath tank is provided therewithin adjacent its inlet end with glass restricting tile means at opposite sides thereof; and said heater means includes at least one of said flat graphite heating elements disposed generally parallel to said molten glass and at opposite sides of said tank upon said restricting tiles.

3. Apparatus as defined in claim 1, wherein said graphite heating element includes alternately reversely directed portions maintained in generally flat coplanar relationship.

4. Apparatus as defined in claim 1 wherein said heater means includes a portion of said heating element extending exteriorly of said tank and said portion being covered with an antioxidative coating to preclude oxidizing in the normal atmosphere.

5. Apparatus as defined in claim 4 wherein the antioxidative coating is of copper.

References Cited

UNITED STATES PATENTS

| | | |
|---|---|---|
| 3,330,635 | 7/1967 | Loukes et al. |
| 3,330,637 | 7/1967 | Loukes et al. |
| 3,233,995 | 2/1966 | Javaux. |
| 3,305,339 | 2/1967 | Plumat _____ 65—182 |
| 3,442,636 | 5/1969 | Kita. |
| 3,445,214 | 5/1969 | Ormesher _____ 65—182 |

S. LEON BASHORE, Primary Examiner

E. R. FREEDMAN, Assistant Examiner

U.S. Cl. X.R.

65—65, 99, 203, 337, 356